G. R. LANG.
TOOL HOLDER.
APPLICATION FILED JUNE 5, 1909.
973,052.
Patented Oct. 18, 1910.
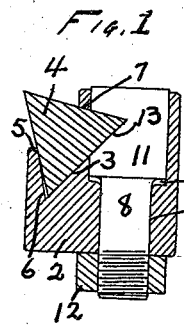
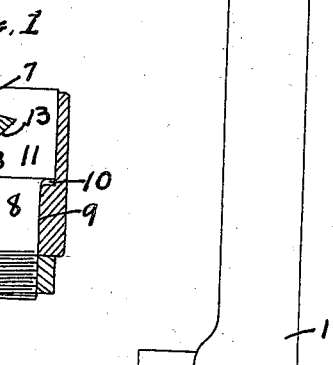
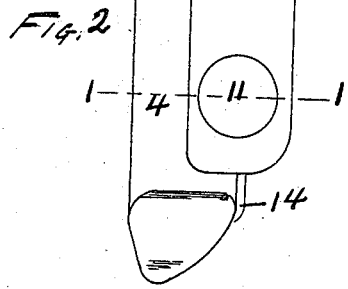
Witnesses
Margaret M. Beigle
Emma C. Hess
Inventor
George R. Lang
by N. C. Lord
Attorney

UNITED STATES PATENT OFFICE.

GEORGE R. LANG, OF MEADVILLE, PENNSYLVANIA.

TOOL-HOLDER.

973,052.     Specification of Letters Patent.     Patented Oct. 18, 1910.

Application filed June 5, 1909. Serial No. 500,355.

*To all whom it may concern:*

Be it known that I, GEORGE R. LANG, a citizen of the United States, residing at Meadville, in the county of Crawford and State of Pennsylvania, have invented certain new and useful Improvements in Tool-Holders, of which the following is a specification.

This invention relates to tool holders and consists in certain improvements in the construction thereof as will be hereafter fully described and pointed out in the claims.

More particularly the invention relates to a tool holder which is peculiarly adapted for use with tools of triangular shape in cross section.

The invention is illustrated in the accompanying drawings as follows:—

Figure 1 is a section on the line 1—1 in Fig. 2. Fig. 2 is a plan view of the tool holder with tool arranged at one side. Fig. 3 is a side elevation of the tool holder shown in Fig. 2. Fig. 4 is a plan view of the tool holder with the tool arranged on the opposite side from that shown in Fig. 2.

1 marks the body of the tool holder. This has a side protuberance 2 at its front end. A V shaped slot 3 is arranged partly in this protuberance and partly in the body of the tool holder. The angle of the slot is slightly more acute than that of the tool 4 so that the initial contact between the tool and the side of the slot is at the upper edge 5, the lower edge 6 being initially out of contact. As the tool is clamped the lip at the outer side of the slot is sprung so that there is in effect a spring clamp for the tool, thus assuring a more certain clamping of the tool. The slot is so positioned that the upper face and side face of the tool are just the right angle to give the desired clearance as clearly shown in Fig. 1.

The slot extends into the body of the tool holder forming the overhanging portion 7. The bolt 8 extends vertically through the holder, the holder being provided with the perforation 9 for this purpose. The upper end 10 of this perforation is enlarged so as to receive the head 11 of the bolt. The bolt is provided with a nut 12 at the bottom by which it may be turned down on the tool. The bolt has a notch 13 into which the tool 4 extends. The larger part 10 of the perforation is of sufficient depth to permit of a movement of the head to a clamping position. In manufacturing, the bolt is placed in the perforation and clamped down, and the slot 13 is milled at the same time as the slot 3 is milled. Afterward the bolt is removed and the enlargement 10 slightly deepened to permit the clamping movement of the bolt. The notch 13 locks the bolt against turning so it is not necessary to have the head extend above the upper face of the tool holder.

A projection 14 extends outwardly along the inner face of a tool in place in the tool holder. This, as will be seen, is directly opposed to pressure exerted on the tool on the opposite cutting edge. The projection therefore stiffens and supports the tool.

It will be noted that the tool has the cutting edge along its side face. I prefer to have this extend out at least as far as the side of the protuberance 2 so that any cut made by the tool can be followed in on a line with its edge without interference by the tool holder. For this reason it is preferable to have the working edge along the side of the tool slightly overhang the protuberance 2 as clearly shown in Fig. 1.

What I claim as new is:

1. A tool holder having a V-shaped slot partly open at the top, the walls of one of the lower sides of the slot forming a lip projecting beyond the side of the tool holder above the slot, and leaving an opening at the top of the slot extending partly across the same, and adapted to hold a tool of triangular shape in cross section, with its edge extending at least flush with the side of the tool holder; and means for clamping a tool in the holder.

2. A tool holder having a V-shaped slot partly open at the top, the walls of one of the lower sides of the slot forming a lip projecting beyond the side of the tool holder above the slot, and leaving an opening at the top of the slot extending partly across the same, and adapted to hold a tool of triangular shape in cross section with its edge overhanging and extending beyond the side of the tool holder; and means for clamping a tool in the holder.

3. A tool holder, having a slot partly open at the top, the walls of one of the lower sides of the slot forming a lip projecting beyond the side of the tool holder above the slot and leaving an opening at the top of the slot extending partly across the same, and adapted to hold a tool of triangular shape in cross section, with its edge extending at least flush with the side of the tool holder, the angle at the bottom of the slot being more acute than that of the tool for the purpose described; and means for clamping the tool in the holder.

4. A tool holder having a V-shaped slot partly open at the top, the walls of one of the lower sides of the slot forming a lip projecting beyond the side of the tool holder above the slot, and leaving an opening at the top of the slot extending partly across the same, and adapted to hold a tool of triangular shape in cross section and a projection extending forwardly from the holder with its surface in the same plane as the inner lower surface of the slot.

5. A tool holder having a V-shaped slot partly open at the top, the walls of one of the lower sides of the slot forming a lip projecting beyond the side of the tool holder above the slot, and leaving an opening at the top of the slot extending partly across the same, and adapted to hold a tool of triangular shape in cross section with the cutting edge along the open part of the slot and a bolt for engaging a tool in the slot at its upper inner edge.

6. A tool holder having a V-shaped slot partly open at the top, the walls of one of the lower sides of the slot forming a lip projecting beyond the side of the tool holder above the slot, and leaving an opening at the top of the slot extending partly across the same, and adapted to hold a tool of triangular shape in cross section with the cutting edge along the open part of the slot; and a bolt for engaging a tool in the slot at its upper inner edge, the bolt having a notch into which the tool may enter and be engaged.

7. A tool holder having an open sided V-shaped slot and a perforation extending into the inner part of the slot; a notched bolt arranged in the perforation and adapted to engage a tool in the slot and having the support of the walls of the perforation above the point on the bolt in engagement with the tool.

8. A tool holder having an open sided V-shaped slot, and a perforation extending into the slot, the perforation having one portion enlarged; a bolt having a head in the enlarged portion of the perforation provided with a notch to admit the insertion of a tool in the slot and an engagement of a tool by the bolt, the bolt being supported above the notch by the walls of the perforation.

In testimony whereof, I have hereunto set my hand in the presence of two subscribing witnesses.

GEORGE R. LANG.

Witnesses:
  CLINT DENSMORE,
  RAY C. GUNDAKER.